J. J. PATTERSON.
PROTECTOR FOR TREES.
APPLICATION FILED MAR. 27, 1913.
1,082,439.
Patented Dec. 23, 1913.
2 SHEETS—SHEET 1.
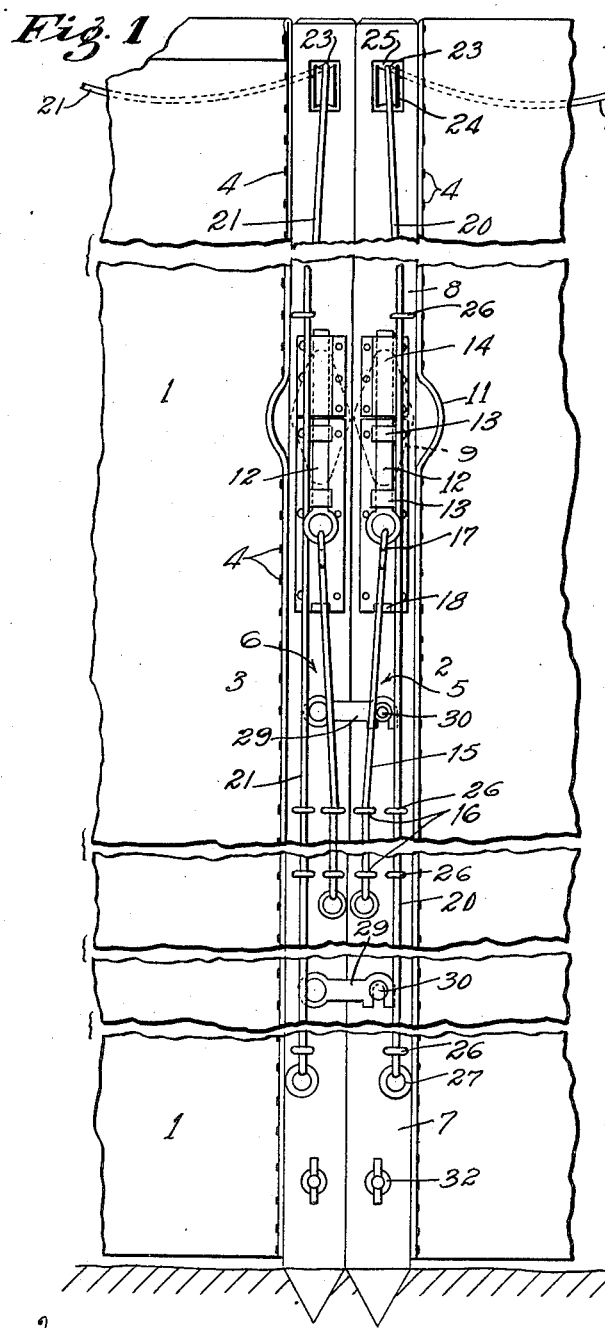
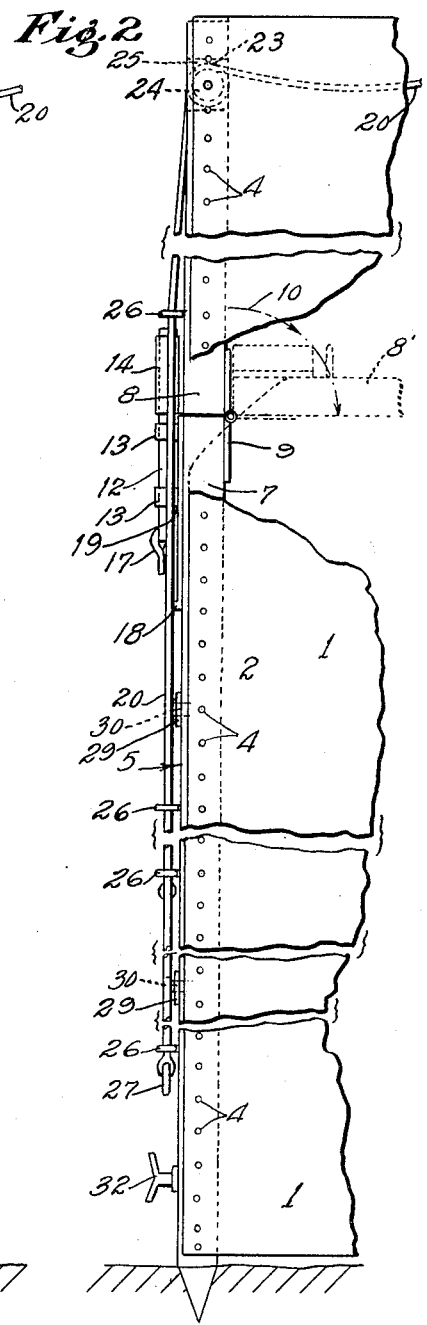
Witnesses
Thor Sjoberg
L. Belle Rice
Inventor
John J. Patterson
by James R. Townsend
his atty

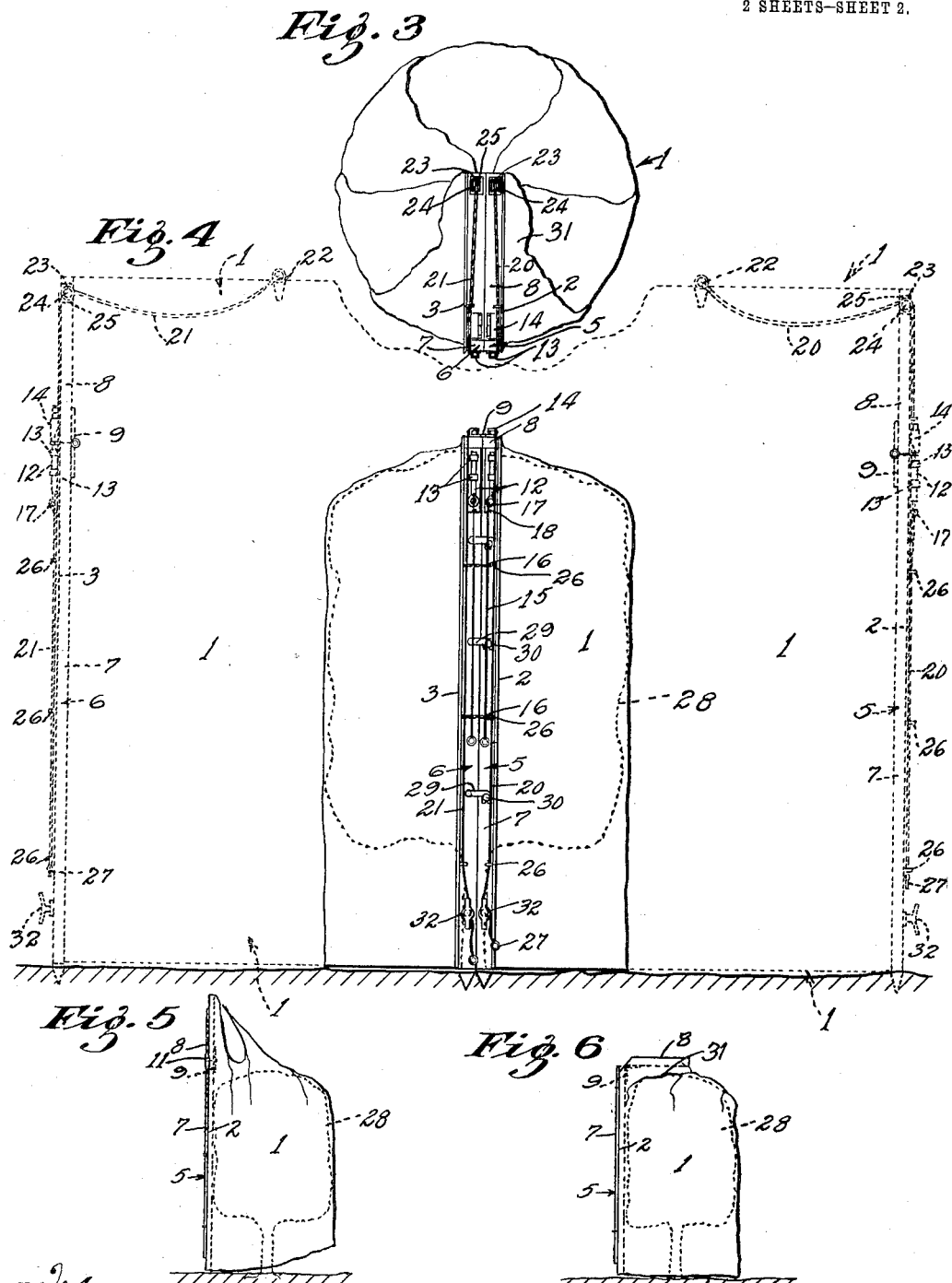

UNITED STATES PATENT OFFICE.

JOHN J. PATTERSON, OF LOS ANGELES, CALIFORNIA.

PROTECTOR FOR TREES.

1,082,439.  Specification of Letters Patent.  Patented Dec. 23, 1913.

Application filed March 27, 1913. Serial No. 757,254.

*To all whom it may concern:*

Be it known that I, JOHN J. PATTERSON, a citizen of the United States, residing at Los Angeles, in the county of Los Angeles and State of California, have invented a new and useful Protector for Trees, of which the following is a specification.

This invention relates to that class of devices used for protecting fruit trees or other vegetation against extreme temperatures such as frost, etc., or against heavy winds which would toss and swing the fruit on its stem, and might either prematurely thresh said fruit from the tree, or else bruise same by rubbing on the harder parts of the tree.

Among other novel and useful features which may hereinafter appear, the protector embodying this invention is characterized by its cheapness, durability and protecting efficiency; and also by the ease with which it may be wrapped around and covered over the tree to which it is applied.

The ease with which this protector may be applied over and around a tree is characterized by the fact that the attendants in putting these protectors into use can with facility do so while standing on the ground near the tree to be wrapped without using any elevating or hoisting means for raising the protector over the tree; and applicant's invention is pioneer in this respect.

The accompanying drawings illustrate the invention.

Figure 1 is an enlarged broken elevation showing a fragment of the protector embracing the invention. Fig. 2 is a side view of the protector fragment shown in Fig. 1. Fig. 3 is a plan view showing a protector as it appears when in place on a tree. Fig. 4 is an elevation showing the protector in place on a tree. The dotted lines show a development of the protector as it appears before it is wrapped around and closed over the tree. Fig. 5 is a diagrammatic view on a reduced scale and shows the protector in process of application to the tree. Fig. 6 is a similar view showing the protector in its final position completely wrapped and closed over the tree.

The construction embodying this invention essentially comprises a suitable protecting sheet 1, illustrated by the dotted-line development in Fig. 4, as having a general rectangular shape with ends 2 and 3. These ends are attached by any suitable means such as tacks 4, Figs. 1 and 2, to rigid means such as the two poles 5 and 6 respectively. The said poles are seen to extend substantially across the full width of said protecting sheet along the ends of same; and for a purpose hereinafter described said poles also comprise a plurality of parts collapsibly connected by hinges. Both poles are substantially identical in structure and the following description of pole 5 will therefore apply also to pole 6. The pole 5 comprises two parts 7 and 8 collapsibly connected to each other by hinge 9, Fig. 2, whereby it is possible for part 8 to swing in the direction of the arrow 10, Fig. 2, into the dotted position 8'. To permit said swinging action to occur freely the sheet 1 is not tacked onto the pole in the vicinity of hinge 9, but is arranged with a loose or bulged portion 11 in Fig. 1. It is desirable at times, however, to maintain pole parts 7 and 8 rigidly in alinement with one another, and to avoid the swinging of the latter relative to the former. For this purpose, suitable latch means are provided which coöperate with both parts to secure the aforesaid alinement when desired. These latch means may, of course, be of any suitable construction, but are shown in the figures as comprising a latch bar 12 permanently carried on the pole part 7 and guided by suitable straps 13. This bar is adapted to slide upward through another strap 14, which is permanently secured to pole part 8 and when positioned in the last said strap, as in Fig. 2, the bar 12 maintains the pole parts 7 and 8 in alinement with one another. A string or cable 15 preferably passing through eyes 16, Fig. 1, is attached to latch bar 12 as at 17, and when it is desired to drop pole part 8 into its dotted position 8', Fig. 2, the string or cable 15 is pulled downward so as to completely withdraw latch bar 12 from the strap 14. The bar 12 will be arrested in its downward course by means of a stop 18 abutting against shoulder 19, Fig. 2, of bar 12. After the latch bar is withdrawn from strap 14 the upper pole part 8 will, of its own accord, probably topple toward position 8', or else by shaking pole 5 such toppling can be readily caused. For each of said poles, and serving a purpose hereinafter made clear, are provided suitable string means comprising the two strings 20 and 21, respectively. One end of each of said strings is connected at suitable points 22 to the protecting sheet 1, while each of said strings is also slidably connected to one end of either pole, respectively, as shown at 23, Fig. 2, where the string is seen to pass over a pulley 24 in aperture 25. From this point the string is led through suitable eyes or guides 26 and may terminate in a suitable handle or gripping means 27, though these features may, of course, be arranged otherwise to suit the convenience of the user.

In arranging the protector hereinbefore described in position on a tree, the pole parts 7 and 8 on each pole, respectively, are swung into alinement, and are so maintained temporarily by setting the latch means. In the particular construction hereinbefore described this latter step is accomplished by sliding latch bar 12 into the guide 14. After the protector is then spread out it will appear as in the dotted-line development, Fig. 4, and by carrying the two ends of the protecting sheet 1 in opposite directions around the tree,—indicated by dotted lines 28, Figs. 4, 5 and 6,—the poles may be brought up tightly to each other, as in Figs. 1 and 4. At this time suitable fastening means, represented by the hooks and pegs 29 and 30, respectively, on the poles, are manipulated so as to fasten said poles together. The length of the sheet 1 is preferably chosen approximately equal to the perimeter of the tree, so that after drawing said sheet around the tree as aforesaid the protector will have substantially the appearance of a cylindrical sack surrounding the tree and partially open at the top. The strings 20 and 21, together with the collapsible pole parts 8, are next manipulated for closing the upper part of said sack. For this purpose the operator seizes the strings 20 and 21 at some convenient point such as the handle 27 and draws said strings through the pole connection 23.. At the string connection 22 this force is imparted to sheet 1 and serves to fetch the opposite side of said sheet up and over to the pole top as indicated in Fig. 5. After this, strings 15 are manipulated to withdraw latch bar 12 from guide 14, and by the weight of the protector sheet then hanging suspended from the pole top, the upper pole parts 8 will collapse and topple over into the positions indicated in Figs. 3 and 6. Fig. 3 shows how the folds in the sheet usually arrange themselves, and the principal feature is the fold 31, Figs. 3 and 6, which drops onto and closes over the other folds, so as to shut the opening through the top of the protector. The loose end of strings 20 and 21 may finally be wound around spools 32, and the protector will rest lightly upon the tree and will continue to snugly, but adequately cover and protect the tree for as long a period as may be desired.

From the foregoing it will be seen that the protector may be easily and conveniently arranged in position over the tree without appreciable disturbance of the fruit or branch thereof; and in a similar but converse manner the protector may again be removed from the tree when desired. This convenience and ease of manipulation is of importance, particularly where the protector is to be used on orange trees in mild climates where the protector will be used only intermittently during the comparatively short cold periods. In service of this type it may be desired to frequently apply the protector to the tree and to remove it therefrom, and under these circumstances convenience of manipulation would be valuable and would attach popularity to the protector.

In choosing suitable material out of which to make the sheet 1 a cheap material is preferably chosen, but the most prominent characteristics which such material should possess are high thermal resistivity, coupled with wind and water proof properties.

From the foregoing detailed description it is believed that the construction and mode of operation, together with the advantages of the devices embracing this invention, will be clear.

I claim:—

1. In a protector for trees, the combination of a pole comprising a plurality of parts hinged together, a protecting sheet attached to each part of said pole, and string means, one end of which is attached to said protecting sheet, and said string means being slidably connected with one end of said pole.

2. In a protector for trees, the combination of a pole comprising two parts hinged together, a protecting sheet attached to said pole, string means, one end of which is attached to said protecting sheet, said string means being slidably connected with one end of said pole, and latch means adapted to coöperate with both parts of said pole.

3. In a protector for trees, the combination of a protecting sheet having two ends, a pole attached to each of said ends, each of said poles comprising two parts hinged together, each of said poles having latch means adapted to coöperate with both parts of said pole to maintain said parts in alinement with each other; a string for each pole, one end of said string being connected with said protecting sheet, and means for fastening said poles together.

4. In a protector for trees, the combination of a protecting sheet having two ends, a pole attached to each of said ends and extending substantially across the full width of said protecting sheet along the ends of same, each of said poles comprising two parts collapsibly connected to one another by hinges, each of said poles having latch means adapted to coöperate with both parts of said pole to maintain said parts in alinement with each other; a string for each pole, one end of said string being connected with said protecting sheet, said string also being slidably connected with the top of its pole, and means for fastening said poles together.

5. A tree protector comprising a sheet; two poles fastened to the ends of the sheets, respectively; each of said poles being composed of lower and upper sections hinged together; the lower sections adapted to hold the lower portions of the sheet ends upright and the upper sections adapted to hold the upper portion of the sheet in folded relation to the lower portion of said sheet.

6. A tree protector comprising a sheet; two poles fastened to the ends of the sheets, respectively; each of said poles being composed of lower and upper sections hinged together; the lower sections adapted to hold the lower portions of the sheet ends upright and the upper sections adapted to hold the upper portion of the sheet in folded relation to the lower portion of said sheet; means to temporarily hold the hinged sections of the poles in rigid alinement, and means to release said section-holding means.

7. A tree protector comprising a sheet; two poles fastened to the ends of the sheets, respectively; each of said poles being composed of lower and upper sections hinged together; the lower sections adapted to hold the lower portions of the sheet ends upright and the upper sections adapted to hold the upper portion of the sheet in folded relation to the lower portion of said sheet; and means to draw the upper edge of the sheet together.

8. A tree protector comprising a sheet; two poles fastened to the ends of the sheets, respectively; each of said poles being composed of lower and upper sections hinged together; the lower sections adapted to hold the lower portions of the sheet ends upright and the upper sections adapted to hold the upper portion of the sheet in folded relation to the lower portion of said sheet; means to draw the upper edge of the sheet together; means to temporarily hold the hinged sections of the poles in rigid alinement, and means to release said section-holding means.

9. In a protector for trees comprising a sheet, rigid means fastened to the ends of the sheet respectively, said means being composed of lower and upper sections, the lower sections adapted to hold the lower portions of the sheet ends upright, and the upper sections adapted to hold the upper portion of the sheet in folded relation to the lower portion of said sheet.

10. In a protector for trees comprising a sheet, rigid means coöperating with said sheet, said means being composed of lower and upper sections, the lower sections adapted to hold the lower portion of the sheet upright, and the upper sections adapted to hold the upper portion of the sheet in folded relation to the lower portion of said sheet, and means to draw the upper portion of the sheet together.

In testimony whereof, I have hereunto set my hand at Los Angeles, California, this 19th day of March, 1913.

JOHN J. PATTERSON.

In presence of—
  JAMES R. TOWNSEND,
  ROBERT A. STEPS.

---

Copies of this patent may be obtained for five cents each, by addressing the "Commissioner of Patents, Washington, D. C."